United States Patent
Stogner et al.

(10) Patent No.: US 7,126,912 B2
(45) Date of Patent: Oct. 24, 2006

(54) METHODS FOR SEQUENCING DATAGRAM TRANSMISSIONS

(75) Inventors: Darrell James Stogner, Plantation, FL (US); Alan P. Conrad, St. Charles, IL (US); Chet A. Lampert, Plantation, FL (US); Robert D. Logalbo, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 1050 days.

(21) Appl. No.: 10/158,038

(22) Filed: May 30, 2002

(65) Prior Publication Data

US 2003/0223441 A1 Dec. 4, 2003

(51) Int. Cl.
H04J 3/02 (2006.01)
H04L 12/54 (2006.01)
G06F 13/00 (2006.01)

(52) U.S. Cl. .............. 370/230; 370/235; 370/395.42; 370/412; 709/232; 709/240

(58) Field of Classification Search .............. 370/230, 370/235, 395.42, 412; 709/232, 240
See application file for complete search history.

(56) References Cited

U.S. PATENT DOCUMENTS

| | | | |
|---|---|---|---|
| 4,914,653 A | | 4/1990 | Bishop et al. |
| 5,361,255 A | | 11/1994 | Diaz et al. |
| 5,729,542 A | * | 3/1998 | Dupont ................. 370/346 |
| 5,752,193 A | * | 5/1998 | Scholefield et al. ...... 455/452.2 |
| 5,793,747 A | * | 8/1998 | Kline ....................... 370/230 |
| 5,956,341 A | * | 9/1999 | Galand et al. ............. 370/412 |
| 5,963,560 A | * | 10/1999 | Kalkunte ................... 370/448 |
| 5,974,465 A | | 10/1999 | Wong |
| 6,104,700 A | * | 8/2000 | Haddock et al. ........... 370/235 |
| 6,205,150 B1 | | 3/2001 | Ruszczyk |
| 6,262,989 B1 | | 7/2001 | Gemar et al. |
| 6,401,147 B1 | | 6/2002 | Sang et al. |
| 6,487,212 B1 | | 11/2002 | Erimli et al. |
| 6,912,225 B1 | * | 6/2005 | Kohzuki et al. ........... 370/412 |
| 6,957,267 B1 | * | 10/2005 | Awasthi ..................... 709/232 |

FOREIGN PATENT DOCUMENTS

EP 1 158 699 A2 5/2001

* cited by examiner

Primary Examiner—Alpus H. Hsu

(57) ABSTRACT

Methods for sequencing datagram transmissions are disclosed, including, receiving an unqueued segment to be enqueued in a queue. The queue comprises at least one segment. Determining a priority level and a number of attempted transmissions for the unqueued segment (100). If the unqueued segment is enqueued in front of a segment belonging to a datagram in the queue, and at least one segment belonging to the datagram has been transmitted before all the segments belonging to the datagram have been transmitted, at least one of the following functions is performed: discarding any remaining segments belonging to the datagram in the queue, transmitting any remaining segments belonging to the datagram in the queue, and re-enqueuing segments belonging to the datagram at the same location in the queue as the partially transmitted datagram, but with a different identifier.

21 Claims, 3 Drawing Sheets

METHODS FOR SEQUENCING DATAGRAM TRANSMISSIONS

FILED OF THE INVENTION

The present invention relates generally to methods for sequencing datagram transmissions.

BACKGROUND OF THE INVENTION

Various network protocols have been developed to allow the transfer of information, such as voice, video or application data, between endpoints (either network infrastructure or devices subscribed to the network). In all cases, the endpoints are given a finite amount of resources to accomplish their information transfer. Scheduling is the process by which the endpoint determines the order in which information multiplexed from many sources is sent over the transport.

An example is a cellular phone designed to use the IS-136 or GSM protocol, which is given a fixed number of timeslots per second to transmit audio. In this case, the required throughput is known a priori and sufficient bandwidth is guaranteed to support the lone data source. The scheduler simply transfers audio packets on a first in, first out basis without fear that packets will timeout (i.e., expire because they remained unsent for their allotted lifetime).

Another example is the packet data component of the TETRA protocol. In this case, each service context establishes its own private link. These links might provide a different quality of service (e.g., a specific priority level, confirmed or unconfirmed transfer, etc.). Again, in this case, since the data on a link is of the same class, it can be scheduled using a simple first in, first out basis.

As customer needs expand to high data rate applications, networks will evolve towards more universal protocols that can support multiple service types at the same time. A common endpoint in such a network might be supporting a video call with associated audio, and at the same time, transferring files or downloading web pages over the Internet. Efficient designs will forgo the wasteful setup of multiple links or contexts and instead multiplex all information over one, common connection.

The joining of all information sources onto a common connection will introduce numerous problems that have yet to be encountered. For example, packets on a link are typically identified using a finite number sequence that wraps around in a modulo manner. When confirmed and unconfirmed packets share the same link, the opportunity arises for a confirmed packet to block the transmission of a rapid arrival unconfirmed packet stream (e.g., from an audio or video CODEC). That is, the packet number of the fast arriving unconfirmed packets might wrap around to the packet number held by the confirmed packet, which has yet to resolve. This might happen due to the confirmed packet being a low priority or requiring multiple attempts to successfully transfer.

In previous systems, such ambiguity was not an issue. A technique common to the art and known as windowing was used to limit the number of packets in flight on a confirmed link at any given moment. Packets on an unconfirmed link could be sent in order to prevent any packet number wrapping. It is a necessity that any new protocol also be capable of avoiding packet number ambiguity. Other desirable traits would be to minimize throughput delay, guarantee the quality of service and provide support for as many quality levels as needed.

Thus, there exists a need for sequencing datagram transmissions.

BRIEF DESCRIPTION OF THE FIGURES

A preferred embodiment of the invention is now described, by way of example only, with reference to the accompanying figures in which.

DETAILED DESCRIPTION OF THE PREFERRED EMBODIMENT

The present invention utilizes at least one queue to sequence datagram transmissions. A datagram is a grouping of information (e.g., an IP packet, an ATM cell, a frame relay frame, etc.). The datagram is typically divided into segments small enough to fit over the transport, although in some cases, a segment may contain one or more whole datagrams. Preferably, all segments for a datagram are queued at the same time; all segments for a selective retry, however, are not necessarily queued together. The present invention classifies datagrams as confirmed or unconfirmed. The transmitter of a confirmed datagram requires acknowledgement/negative acknowledgment of each segment belonging to the confirmed datagram from the receiver of the segment; as a result, individual confirmed segments that were not successfully received at the receiver may be retransmitted. The transmitter of the unconfirmed datagram, however, does not require acknowledgement/negative acknowledgment of the unconfirmed segments from the receiver of the segments; as a result, the preferred embodiment of the present invention assumes that unconfirmed datagrams are transmitted in their entirety once the first segment belonging to the unconfirmed datagram has been transmitted; however, the present invention is not limited to this assumption (as depicted in an example below). It should also be noted that unconfirmed datagrams could be re-transmitted under a guise of a different identifier (as explained below in the enqueuing rules).

In the preferred embodiment of the present invention, segments are enqueued based on priority, and within a priority level, the segments with a higher number of attempted transmissions have precedence over the segments with a lower number of attempted transmissions; typically, segments are dequeued when the segment is transmitted or discarded. Enqueuing is the act of taking segments and placing them into at least one queue according to at least a portion of a set of enqueuing rules of the present invention (described in detail below); dequeuing is the act of removing segments from at least one queue in any fashion or for any reason. In the preferred embodiment of the present invention, the act of enqueuing segments is performed by the logical link control layer ("LLC"), however, enqueuing can be performed by other components as well. Optionally, the type of service provided can be requested (e.g., maximum reliability, minimum delay, etc.).

Figure 1:
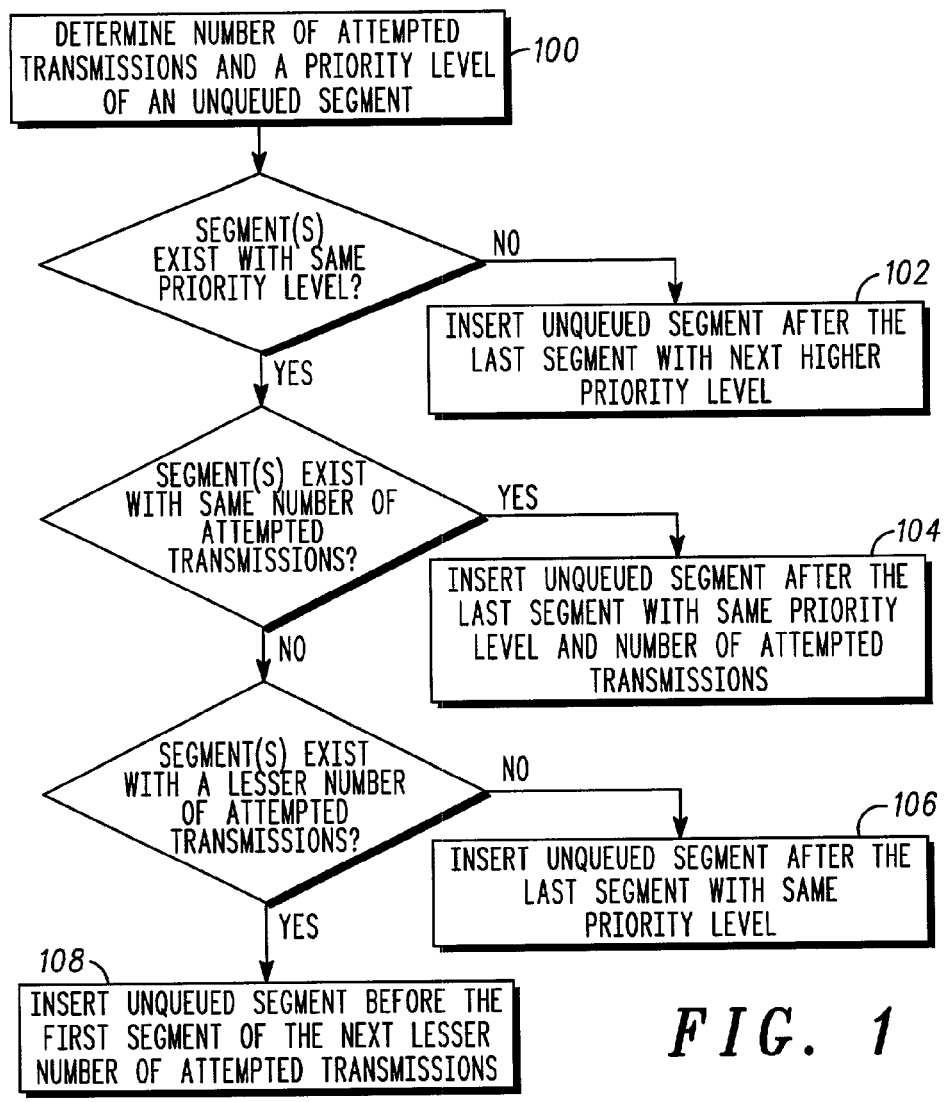
FIG. 1 illustrates a flowchart of the enqueuing rules in accordance with the present invention.

As shown in FIG. 1, in the preferred embodiment, when a segment is to be enqueued, the number of attempted transmissions and the priority level of the unqueued segment is determined 100. The priority level implies the position of the segment in the queue; in other words, the higher priority segments (e.g., priority level 1) are transmitted sooner than the lower priority segments (e.g., priority level 3). Once the unqueued segment is received by the LLC, the rules to place the unqueued segment into at least one queue are as follows:

1a. If no segment in the queue exists with the same priority level as the unqueued segment, the unqueued segment is inserted after the last segment of all segments in the queue having a higher priority level 102;

1b. If a segment in the queue exists with the same priority level and the same number of attempted transmissions as the unqueued segment, the unqueued segment is inserted after the last segment having the same priority level and the same number of attempted transmissions 104;

1c. If a segment in the queue exist with the same priority level, and without the same number of attempted transmissions, but with a greater number of attempted transmissions than the unqueued segment, the unqueued segment is inserted immediately after all of the segments having the same priority level and a greater number of attempted transmissions 106;

1d. If a segment in the queue exist with the same priority level, and without the same number of attempted transmissions, but with a lesser number of attempted transmissions than the unqueued segment, the unqueued segment is inserted immediately before all of the segments having the same priority level and a lesser number of attempted transmissions 108;

2. if the unqueued segment is enqueued in front of an unconfirmed datagram, and at least one segment of the unconfirmed datagram has been transmitted before all the segments of the unconfirmed datagram have been transmitted, one of three sub-rules must apply:

a. the remaining segments of the interrupted unconfirmed datagram in the queue are discarded;
 b. the remaining segments of the interrupted unconfirmed datagram in the queue are transmitted; or
 c. the entire unconfirmed datagram is re-enqueued at the same location in the queue as the partially transmitted datagram, but with a different identifier.

It should be obvious to a person of ordinary skill in the art that the enqueuing rules described above, or any portion thereof, does not need to be implemented, or additional rules may be added, and still remain within the spirit and scope of the present invention. For example, the following additional rules may be added:

if an unqueued unconfirmed segment is to be enqueued with the same priority level as a confirmed segment previously enqueued for its first attempted transmission, the unconfirmed segment is enqueued in front of the previously enqueued confirmed segment (i.e., precedence is given to an unconfirmed segment over a confirmed segment having the same priority level and number of attempted transmissions, or vice versa);

queue overflow may be addressed by discarding segments previously queued (e.g., segment(s) with the lowest priority level and the lowest number of attempted transmissions, segments that are time-sensitive and that have remained in the queue longer than other segments that are time-sensitive, etc.); and/or transmitting segments of a datagram multiple times for reliability, and scheduling multiple transmission attempts of a segment/datagram sequentially; for example, with a two segment unconfirmed datagram requiring two transmission attempts, examples of sequential transmission attempts include, but are not limited to, segment 1, segment 1, segment 2, segment 2, or segment 1, segment 2, segment 1 segment 2.

Let us now turn our attention to examples of the enqueuing rules of the present invention. The following examples illustrated in FIGS. 2–6 utilize a single queue for enqueuing all segments. Other embodiments of the present invention, however, may utilize a plurality of queues to enqueue the segments (e.g., a separate queue for each priority level, etc.). Further, FIGS. 2–5 will focus on enqueuing segments belonging to datagram E (i.e., the unqueued segments) according to the enqueuing rules of the present invention and determining the positions of the segments belonging to datagram E relative to the other segments previously queued.

Figure 2:
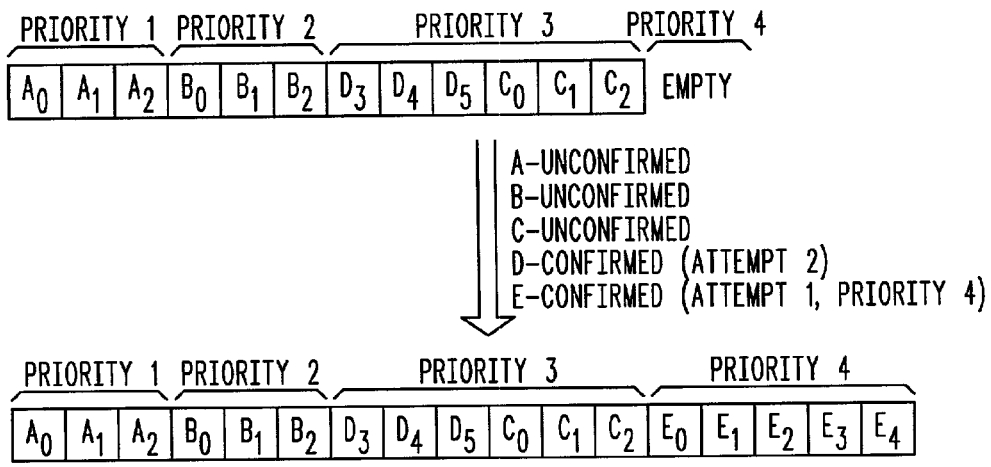
FIG. 2 illustrates an example of placing an unqueued segment into a queue, wherein the unqueued segment has a different priority level than the other segments previously entered in the queue, in accordance with the present invention.

FIG. 2 illustrates an example of enqueuing rule 1a of the preferred embodiment of the present invention. As illustrated in FIG. 2, the LLC has previously received and enqueued segments belonging to datagrams A, B, C and D based on priority. As shown, datagram A is an unconfirmed datagram having a priority level of 1, and segments $A_0$, $A_1$, and $A_2$ are enqueued first; datagram B is an unconfirmed datagram having a priority level of 2, and segments $B_0$, $B_1$ and $B_2$ are enqueued second; datagram C is an unconfirmed datagram having a priority level of 3, and segments $C_0$, $C_1$ and $C_2$ are enqueued fourth; and datagram D is a confirmed datagram having a priority level of 3, and segments $D_3$, $D_4$, and $D_5$ are enqueued third. Since datagrams C and D both have the same priority level (i.e., priority level 3), the LLC gives precedence to the datagrams having the higher number of attempted transmission, thus the LLC enqueues segments $D_3$, $D_4$ and $D_5$ before segments $C_0$, $C_1$ and $C_2$ because datagram D is on its second transmission attempt whereas datagram C is on its first transmission attempt. It should be noted that only a portion of datagram D (i.e., $D_3$, $D_4$ and $D_5$) is being retransmitted for a second time, which indicates segments $D_0$, $D_1$ and $D_2$ were successfully transmitted during the first transmission attempt; this is possible since datagram D is a confirmed datagram.

Also shown in FIG. 2 are segments belonging to datagram E. Datagram E is a confirmed datagram having a priority level of 4; datagram E is divided into segments $E_0$, $E_1$, $E_2$, $E_3$ and $E_4$. According to this example, datagram E (i.e., the unqueued segments of datagram E) was received after the segments for datagrams A, B, C, and D have been enqueued. Since segments $E_0$, $E_1$, $E_2$, $E_3$ and $E_4$ have the lowest priority level of all the segments enqueued, these segments will be transmitted last. Moreover, since no other segments in the queue exist with the same priority level as the segments belonging to datagram E, precedence within a priority level does not need to be determined based on attempted transmissions.

Figure 3:
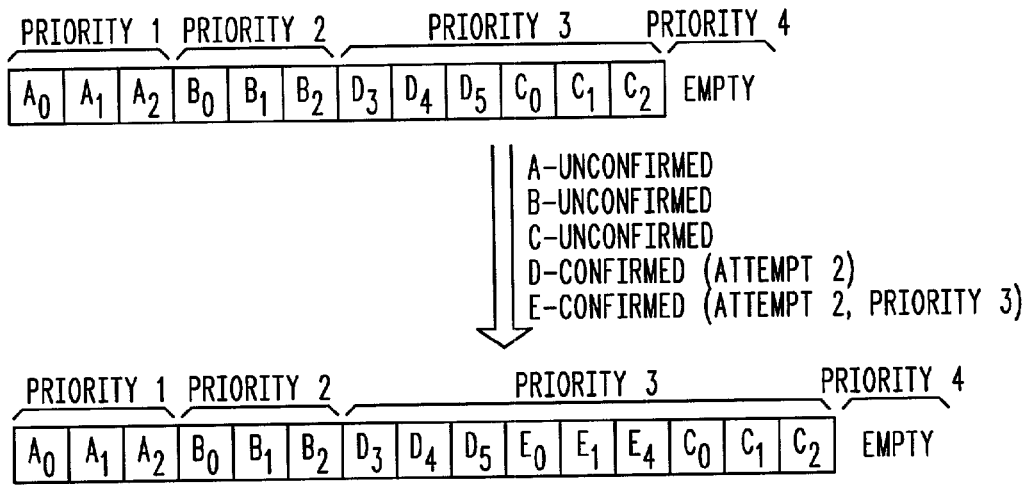
FIG. 3 illustrates an example of placing an unqueued segment into the queue, wherein the unqueued segment has the same priority level and number of attempted transmission of another segment in the queue, in accordance with the present invention.
Figure 4:
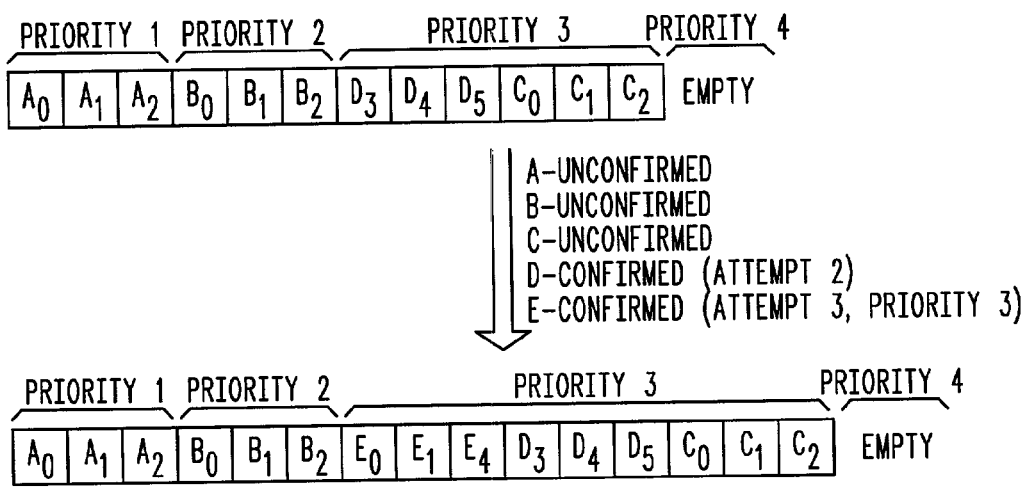
FIG. 4 illustrates an example of placing an unqueued segment into the queue, wherein the unqueued segment has the same priority level of another segment in the queue, however, has a higher number of attempted transmissions, in accordance with the present invention.
Figure 5:
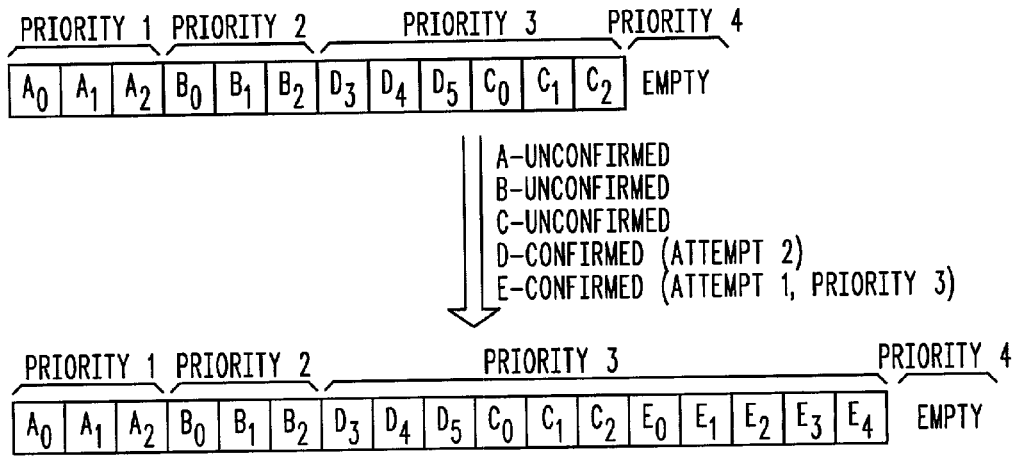
FIG. 5 illustrates an example of placing an unqueued segment into the queue, wherein the unqueued segment has the same priority level of another segment in the queue, however, has a lower number of attempted transmissions, in accordance with the present invention.

It should be noted that the examples illustrated in FIGS. 3, 4, and 5 focus on enqueuing prioritizations for priority level 3; in these upcoming examples, enqueuing prioritizations for priority 1 and 2 remain the same as that described in FIG. 2 since only a single datagram is classified into each of these priority levels (i.e., datagrams A and B, respectively). Moreover, segments belonging to datagram C and D have already been enqueued according to the enqueuing rules of the present invention, and their order in the queue relative to other segments previously queued will not change (for example, in these figures, the segments belonging to datagram D will always precede the segments belonging to datagram C); as a result, enqueuing prioritization will not be addressed with respect to segments belonging to datagrams C and D in FIGS. 3–5. As stated above, FIGS. 3–5 will focus on enqueuing segments belonging to datagram E (i.e., the unqueued segments of datagram E) according to the enqueuing rules of the present invention and determining the positions of the segments belonging to datagram E relative to the other segments previously queued, particularly within priority level 3.

Moving ahead to FIG. 3. FIG. 3 illustrates an example of enqueuing rule 1b of the preferred embodiment of the present invention. The example in FIG. 3 is very similar to that illustrated in FIG. 2, however, datagram E now has a priority level of 3, which is the same priority level as datagrams C and D. Further, it should be noted that in FIG. 3, datagram E is on its second attempt to transmit segments E0, E1, and E4. Since three datagrams have a priority level of 3 in this example (i.e., datagrams C, D, and E), segments belonging to datagram E are enqueued in the following manner:

Segments belonging to the second transmission attempt of datagram D have precedence over segments belonging to the second transmission attempt of datagram E because, even though both datagrams D and E are on their second transmission attempts, the second transmission attempt of datagram D was enqueued before the second transmission attempt of datagram E; and Segments belonging to the second transmission attempt of datagram E have precedence over segments belonging to the first transmission attempt of datagram C because datagram E has a higher number of attempted transmissions than datagram C.

Next, FIG. 4 illustrates an example of enqueuing rule 1c and is similar to the example illustrated in FIG. 3, however, the number of attempted transmissions of datagram E has increased from two attempts to three attempts. As a result, the enqueuing prioritization of segments belonging to datagram E is as follows:

Segments belonging to the third transmission attempt of datagram E has precedence over segments belonging to the first transmission attempt of datagram C and the second transmission attempt of datagram D because datagram E has the highest number of attempted transmissions.

FIG. 5 is an example of enqueuing rule 1d and is also similar to the example illustrated in FIG. 3, however, the number of attempted transmissions of datagram E has decreased from two attempts to one attempt. As a result, the enqueuing prioritization of the segments belonging to datagram E is as follows:

Segments belonging to the second transmission attempt of datagram D have precedence over segments belonging to the first transmission attempt of datagram E because datagram D has a higher number of attempted transmissions than datagram E; and Segments belonging to the first transmission attempt of datagram C now have precedence over segments belonging to the first transmission attempt of datagram E because, even though datagrams C and E have the same number of attempted transmissions, the first transmission attempt of datagram C was enqueued before the first transmission attempt of datagram E.

Figure 6:
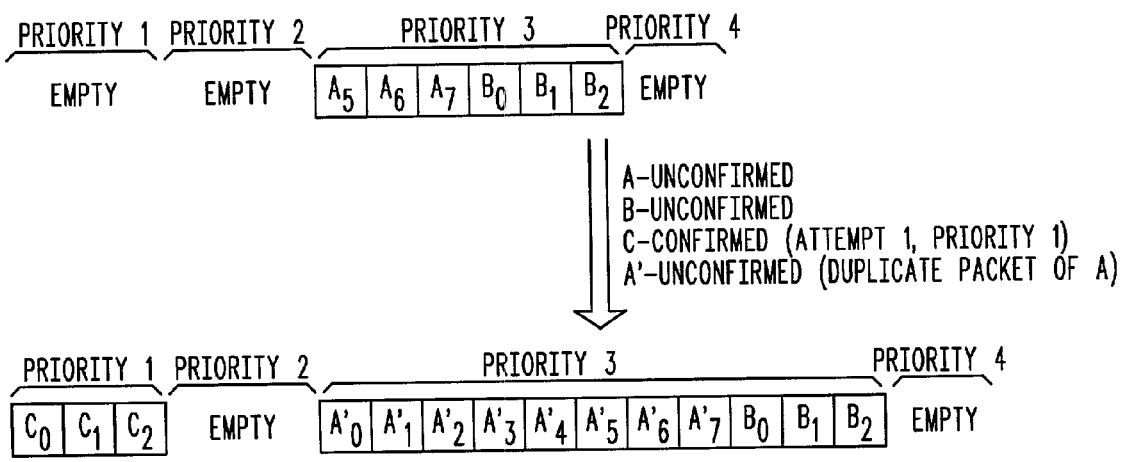
FIG. 6 illustrates an example of placing an unqueued segment into the queue, wherein the unqueued segment causes an interruption of the transmission of an unconfirmed datagram, in accordance with the present invention.

Enqueuing rule 2 is the example illustrated in FIG. 6 and is dissimilar from the examples illustrated in FIGS. 2–5. In FIGS. 2–5, enqueuing the unqueued datagram (i.e., datagram E) did not disrupt the transmission of an unconfirmed segment since there were segments in the queue that were of a higher priority than the segments of the unqueued datagram, thus preventing the immediate transmission of the segments of the unqueued datagram. In FIG. 6, however, the enqueuing of the unqueued datagram (i.e., in this example, datagram C) causes disruption of the attempted transmission of an unconfirmed segment (i.e., in this example, $A_5$). As illustrated in FIG. 6, datagrams A and B have a priority level of 3 and are both unconfirmed datagrams. Prior to enqueuing segments belonging to datagram C, segment $A_5$ is the next segment to be transmitted. Before or during the transmission of segment $A_5$, datagram C is received having a priority level of 1. Since datagram C has a priority level higher than any other datagram in the queue, including the remaining segments of datagram A, the LLC enqueues the segments belonging to datagram C to be transmitted next. As a result, the transmission of unconfirmed datagram A is interrupted because now the next segment to be transmitted is segment $C_0$ as opposed to segment $A_5$. Since the transmission of unconfirmed datagram A was interrupted (i.e., a segment from a second datagram (i.e., datagram C) was transmitted before all the segments of a first datagram was transmitted), all the segments belonging to unconfirmed datagram A remaining in the queue are discarded, and the entire unconfirmed datagram A is re-enqueued with a different identifier (i.e., in this case, datagram A'). It is important to note that datagrams A and A' are identical, however, a different identifier is provided when re-enqueued to avoid the problem of datagram ambiguity.

It should be noted that if the enqueuing of an unqueued datagram causes disruption of the attempted transmission of a confirmed datagram, the remaining segments belonging to the confirmed datagram in the queue will still be transmitted; in the preferred embodiment, the remaining segments belonging to the confirmed datagram will be transmitted after transmission of the unqueued datagram, and any other datagram/segement that has been enqueued in front of the remaining segments belonging to the confirmed datagram. As noted above, transmitting the confirmed segments belonging to the confirmed datagram at a later time is allowable because the transmitter receives an acknowledgment/negative acknowledgment from the receiver as to which segments were received/not received.

At this point, the enqueuing rules and examples of enqueuing prioritization have been described. Let us now turn the discussion to the receiver of the segments. In the preferred embodiment, when the receiver receives a segment from a single transmitter, the segment is determined to be an unconfirmed or a confirmed data segment. When the receiver determines that an unconfirmed segment from datagram X has been received, the receiver waits for the remaining segments of datagram X until at least one of the following events occur:

1. a segment from datagram Y is received;

2. a trigger occurs (e.g., an elapsed amount of time, frequency change, etc.) that informs the receiver to no longer wait for the remaining segments; and/or 3. all of the unconfirmed segments belonging to datagram X are received.

When the receiver determines that a confirmed segment has been received, it assumes that no more than n confirmed datagrams are in flight at any given time (where n is the window size), the following rules apply:

1. The receiver must maintain all received segments for confirmed datagram X until:
   a. all segments have been properly received, in which case the receiver re-assembles the confirmed datagram and passes it onto the application; or
   b. the final transmission attempt for the confirmed datagram X has failed, in which case the receiver discards all of the received segments from confirmed datagram X;

2. After each transmission attempt has been completed, the receiver acknowledges all successfully received segments.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

We claim:

1. A method comprising:
   receiving an unqueued segment to be enqueued in a queue, wherein the queue comprises at least one segment;
   determining a priority level of the unqueued segment;
   determining a number of attempted transmissions for the unqueued segment; and
   if a segment in the queue exists with the same priority level and the same number of attempted transmissions as the unqueued segment, inserting the unqueued segment after a last segment in the queue having the same priority level and the same number of attempted transmissions.

2. The method of claim 1 wherein the queue is a plurality of queues, and wherein the unqueued segment is enqueued into one of the plurality of queues.

3. The method of claim 1 wherein the unqueued segment and at least one segment in the queue comprises at least one of the following: a complete datagram, and a portion of a datagram.

4. The method of claim 1 further comprising, if the step of inserting results in a queue overflow, discarding the segment having a lowest priority level and lowest number of attempted transmissions.

5. The method of claim 1 further comprising, if the step of inserting results in a queue overflow, discarding the segment in the queue that is time-sensitive and that has been in the queue longer than other segments that are time-sensitive.

6. A method comprising:
   receiving an unqueued segment to be enqueued in a queue, wherein the queue comprises at least one segment;
   determining a priority level of the unqueued segment;
   determining a number of attempted transmissions for the unqueued segment; and
   if a segment in the queue exist with the same priority level, and without the same number of attempted transmissions, but with a greater number of attempted transmissions than the unqueued segment, inserting the unqueued segment after all of the segments in the queue having the same priority level and a greater number of attempted transmissions.

7. The method of claim 6 wherein the queue is a plurality of queues, and wherein the unqueued segment is enqueued into one of the plurality of queues.

8. The method of claim 6 wherein the unqueued segment and at least one segment in the queue comprises at least one of the following: a complete datagram, and a portion of a datagram.

9. The method of claim 6 further comprising, if the step of inserting results in a queue overflow, discarding the segment having a lowest priority level and lowest number of attempted transmissions.

10. The method of claim 6 further comprising, if the step of inserting results in a queue overflow, discarding the segment in the queue that is time-sensitive and that has been in the queue longer than other segments that are time-sensitive.

11. A method comprising the steps of:
    receiving an unqueued segment to be enqueued in a queue, wherein the queue comprises at least one segment;
    determining a priority level of the unqueued segment;
    determining a number of attempted transmissions for the unqueued segment; and
    if a segment in the queue exist with the same priority level, and without the same number of attempted transmissions, but with a lesser number of attempted transmissions than the unqueued segment, inserting the unqueued segment before all segments in the queue having the same priority level and a lesser number of attempted transmissions.

12. The method of claim 11 wherein the queue is a plurality of queues, and wherein the unqueued segment is enqueued into one of the plurality of queues.

13. The method of claim 11 wherein the unqueued segment and at least one segment in the queue comprises at least one of the following: a complete datagram, and a portion of a datagram.

14. The method of claim 11 further comprising, if the step of inserting results in a queue overflow, discarding the segment having a lowest priority level and lowest number of attempted transmissions.

15. The method of claim 11 further comprising, if the step of inserting results in a queue overflow, discarding the segment in the queue that is time-sensitive and that has been in the queue longer than other segments that are time-sensitive.

16. A method comprising the steps of:
    receiving an unqueued segment to be enqueued in a queue, wherein the queue comprises at least one segment;
    determining a priority level of the unqueued segment;
    determining a number of attempted transmissions for the unqueued segment; and if the unqueued segment is enqueued in front of a segment belonging to a datagram in the queue, and at least one segment belonging to the datagram has been transmitted before all the segments belonging to the datagram have been transmitted, performing at least one of the following functions: discarding any remaining segments belonging to the datagram in the queue, transmitting any remaining segments belonging to the datagram in the queue, and re-enqueuing segments belonging to the datagram at the same location in the queue as the partially transmitted datagram, but with a different identifier.

17. The method of claim 16 wherein the datagram is one of the following: an unconfirmed datagram or a confirmed datagram.

18. The method of claim 16 further comprising transmitting the unqueued segment.

19. The method of claim 18 further comprising:
receiving the at least one segment belonging to the datagram that has been transmitted;
receiving the unqueued segment before all the segments belonging to the datagram has been received; and
discarding the at least one segment belonging to the datagram that has been received.

20. The method of claim 16 wherein the queue is a plurality of queues, and wherein the unqueued segment is enqueued into one of the plurality of queues.

21. The method of claim 16 wherein the unqueued segment and at least one segment in the queue comprises at least one of the following: a complete datagram, and a portion of a datagram.

* * * * *